United States Patent [19]

McDonald

[11] 3,915,458

[45] Oct. 28, 1975

[54] RECORD PLAYER PICK-UP ARM RETAINING CLIP

[75] Inventor: Daniel McLean McDonald, Geneva, Switzerland

[73] Assignee: Glenburn Engineering (U.K.) Limited, Warwick, England

[22] Filed: Apr. 30, 1974

[21] Appl. No.: 465,614

[52] U.S. Cl. .................................................. 274/1 R
[51] Int. Cl.$^2$ .......................................... G11B 17/02
[58] Field of Search ..................................... 274/1 R

[56] References Cited

FOREIGN PATENTS OR APPLICATIONS 798,127 7/1958 United Kingdom ............... 274/23 B

*Primary Examiner*—Harry N. Haroian
*Attorney, Agent, or Firm*—Friedman & Goodman, Esqs.

[57] ABSTRACT

An assembly comprising a record player having a deck plate, an arm mounted on the deck plate for pivotal movement in a horizontal plane, a rest post mounted on the deck plate and a clip comprising a first part releasably and resiliently engaged with said post and a second part releasably engaged with said arm so that said clip secures said arm relative to said post.

7 Claims, 2 Drawing Figures

RECORD PLAYER PICK-UP ARM RETAINING CLIP

BACKGROUND OF THE INVENTION

Field of the Invention

This invention relates to a means for securing, during transit of the record player, a horizontally pivotable arm of the record player, such as the pick-up arm or control arm, to a rest post provided on the deck plate of the record player to support the pick-up arm when not in use.

It will be appreciated that since the pick-up arm of a record player is normally supported for limited pivotal movement about a horizontal and vertical axis and the control arm is normally supported for limited pivotal movement about a horizontal axis and sliding movement along a vertical axis then during transit of the record player unless some securing means are provided movement of the arms may occur which might result in damage to the arms, the pick-up or other parts associated with the arms.

SUMMARY OF THE INVENTION

It is, therefore, an object of the present invention to provide means for securing a horizontally pivotable arm of a record player to a rest post mounted on the deck plate of the record player.

It is a further object of the invention to provide an assembly comprising a record player having a horizontally pivotable arm, and a rest post mounted on the deck plate, and a clip comprising a first part releasably and resiliently engaged with said post and a second part releasably engaged with said arm so that said clip secures said arm relative to said post.

The clip may be resiliently engaged with said arm.

The arm may be a pick-up arm. Alternatively the arm may be a record control arm.

The record player may include a record control arm movable to a transit position wherein the control arm is disposed above the pick-up arm and is prevented from upward movement relative thereto, and wherein the clip includes a part to engage the control arm whereby upward movement of the clip relative to the rest post is restrained.

The rest post may be provided with a pick-up arm retaining clamp and said clip may engage a part of said clamp to hold the clamp in clamping relationship with the pick-up arm.

BRIEF DESCRIPTION OF THE DRAWINGS

The invention will now be described in more detail, by way of example, with reference to the accompanying drawings wherein.

DESCRIPTION OF THE PREFERRED EMBODIMENT

Figure 1:
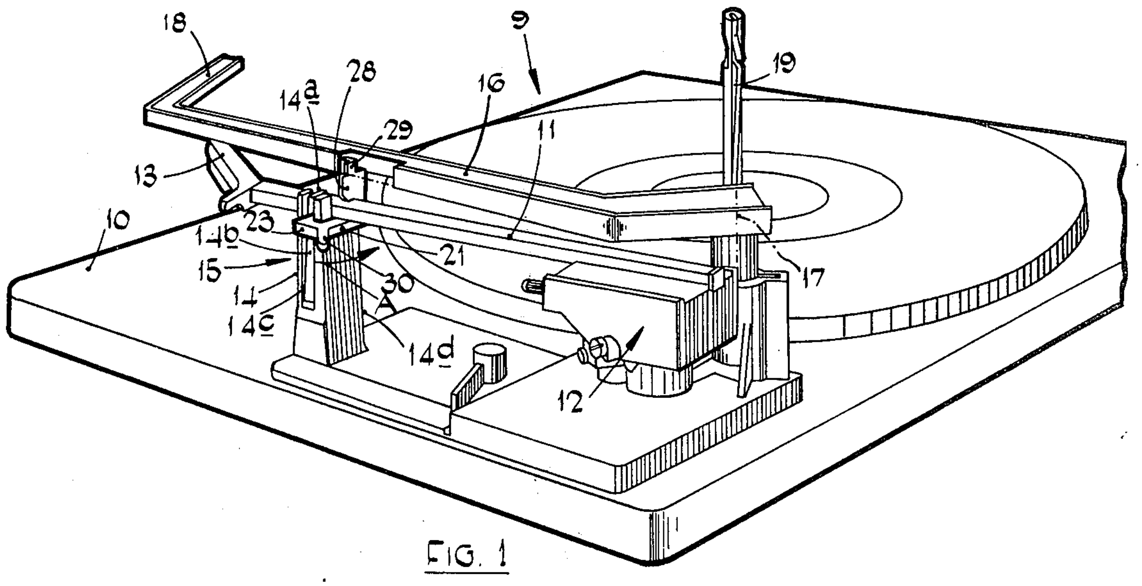
FIG. 1 is a perspective view, partly broken away, of a record player with a clip embodying the invention holding the pick-up arm and the record control arm in a retaining position.

Referring first to FIG. 1, a record player has a deck plate 10 upon which a pick-up arm 11 is pivotally mounted at one end 12 about a vertical axis and about a horizontal axis. The pick-up arm 11 has a pick-up 13 at its other end. A rest post 14 of rectangular cross-section is provided secured to the record player deck plate 10 to extend vertically upwardly therefrom and upon which the arm 11 may rest when not in use. The post 14 is provided with a pick-up arm clamp 15 of conventional form having a part 14*a* which engages over the top of the arm 11 to hold the arm on the post and which is provided on a part 14*b* pivotally mounted in a slot 14*c* in the post 14.

A record control arm 16 of inverted U-shape in cross-section and having an inclined end part 18, is pivotally mounted about a vertical axis 17 for limited pivotal movement in a horizontal plane. The control arm 16 is movable from an operative position in which the inclined end part 18 partially surrounds the spindle 19 of the record player and in which the arm can move vertically up and down along the axis 17, to a transit position wherein the control arm is located vertically above the pick-up arm and is prevented from movement in a direction away from the deck plate.

Figure 2:
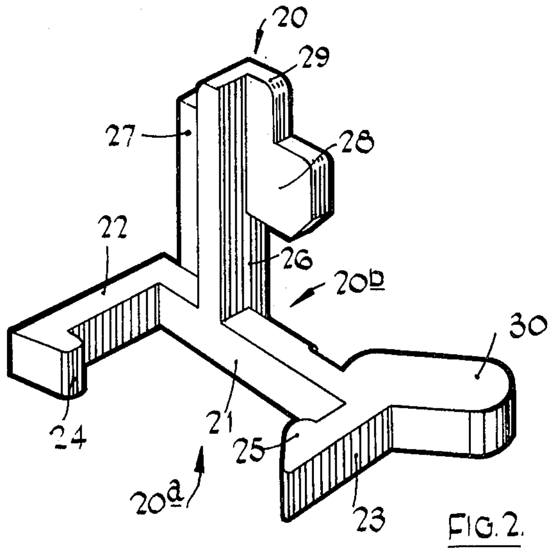
FIG. 2 is a perspective view of the retaining clip of FIG. 1.

Referring now particularly to FIG. 2 of the drawings, a clip 20 made from a resilient synthetic plastics material has a first U-shaped portion 20*a* comprising a base part 21 and two resilient side members 22 and 23 having inwardly directed shoulders 24 and 25 respectively at the free ends of the members. The base part 21 has an upright member 26 extending normally therefrom and provided with a stiffening rib 27 and a transversely extending portion 28. The upright member 26 and transversely extending portion 28 co-operate with the base member 21 to define a second generally U-shaped part 20*b*.

The upright member 26 is provided with an extension part 29 for a purpose hereinafter to be described.

If desired the rest post may be of a shape other than rectangular in cross-section as may be the pick-up arm and control arm. For example, the parts may be of circular shape in cross-section and in such cases the first and second generally U-shaped parts would be of a shape to conform to the shape of the post and arm.

In use, the clip 20 is placed around the pick-up arm 11 so that the second generally U-shaped portion 20*b* embraces the arm 11, the lower surface of the transversely extending portion 28 being in contact with the upper surface of the pick-up arm 11 and the lower surface of the pick-up arm 11 being in contact with the base member 21 whilst a side of the upright member 26 engages a side of the arm 11.

The clip 20 is then moved in a direction along the pick-up arm 11 towards the rest post 14 and pressure is applied in the same direction until, by resiliently deforming the members 22 and 23, the first generally U-shaped part 20*a* defined by the members 22, 23 and base part 21 embraces the post 14. The member 22 engaging one side of the post and the shoulder 24 thereon engages around corner 14*d* as the base member 21 engags an adjacent side of the post. The member 23 engags with a part only of a third side of the post and the shoulder 25 lies within the slot 14*c* and engages with the part 14*b* of the clamp to hold the clamp in clamping relation with the arm 11. The inwardly directed shoulders 24 and 25 provided on the members 22 and 23 respectively prevent the clip becoming detached from the post 14 until a substantial force is applied to remove the clip. The pick-up arm 11 is thus secured against movement relative to the post 14.

The record control arm 16 may now be pivoted about the axis 17 from its operative position to a transit position substantially parallel to and above the pick-up arm 11. Such pivotal movement will bring the record control arm 16 into abutment with the upwardly projecting part 29 of the clip 20.

The end part 18 of the record control arm is then moved in an upwards direction, a limited amount of movement in this direction being permitted as a result of resilience of the control arm 16, to permit continued pivotal movement of the arm so that the second part 29 of the clip 20 can be engaged within the U-shaped undersurface of the record control arm 16. Movement of the record control arm 16 in a horizontal plane is now prevented. Movement in an upwards direction is prevented because of the mounting arrangement of the record control arm 16 as described hereinbefore and thus the record control arm 16 serves to prevent upward displacement of the clip from the rest post. The engagement of the extension part 29 also restrains movement of the record control arm in a horizontal direction.

In order to disengage the clip 20 from the part 14, a projection 30 is provided which when pressed in a direction indicated by the arrow A in FIG. 1 has the result of resiliently deforming the arm 23 in an outwards direction thus releasing the clip 20 from the post 14.

It will thus be seen that the clip 20 provides a firm securing means for ensuring that the pick-up arm 11 and record control arm 16 are secured relative to the rest post 15 of the record player thus preventing damage occurring to either the record control arm 16 or the pick-up arm 11 caused by movement whilst the record player is in transit.

In the case of a record player where no control arm is provided, for example, a record player with an "umbrella" type of centre spindle, the clip is as described hereinbefore except that the extension part 29 is not provided.

If desired the clip may be arranged so as only to engage the control arm, retention of the pick-up arm being achieved in some other manner for example by means of the pick-up arm clamp described hereinbefore.

I claim:

1. An assembly comprising a record player having a deck plate, an arm mounted on the deck plate for pivotal movement in a horizontal plane, a rest post mounted on the deck plate and a clip comprising a first part releasably and resiliently engaged with said post and a second part releasably engaged with said arm so that said clip secures said arm relative to said post, wherein said clip comprises a first generally U-shaped portion having a base part and two resilient side members releasably and resiliently engaged with the rest post and an upright member extending from said base part normal to the plane of said generally U-shaped portion, said upright member being provided with a part extending in a direction substantially parallel to said plane to provide a second generally U-shaped portion releasably and resiliently engaged with said arm.

2. An assembly according to claim 1 wherein the free ends of said side members are provided with inwardly directed shoulders.

3. An assembly according to claim 1 wherein said arm is a pick-up arm and the upright member is provided with means engaged with a record control arm.

4. An assembly according to claim 1 wherein the clip is made from a synthetic plastics material.

5. An assembly according to claim 1 wherein the arm is a pick-up arm.

6. An assembly according to claim 5 wherein the record player includes a record control arm moveable to a position wherein the control arm is disposed above the pick-up arm and is prevented from upward movement relative thereto and wherein the clip includes a part to engage the control arm whereby movement of the clip relative to the rest post is restrained.

7. An assembly according to claim 5 wherein the rest post is provided with a pick-up arm retaining clamp and the clip is engaged with a part of said clamp to hold the clamp in clamping relationship with the pick-up arm.

* * * * *

UNITED STATES PATENT OFFICE
CERTIFICATE OF CORRECTION

PATENT NO. : 3,915,458

DATED : October 28, 1975

INVENTOR(S) : Daniel McLean McDonald

It is certified that error appears in the above-identified patent and that said Letters Patent are hereby corrected as shown below:

On the cover sheet insert:

-- [30] Foreign Application Priority Data

United Kingdom 21178/73 May 4, 1973 --.

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*